(12) United States Patent
Cherry et al.

(10) Patent No.: US 7,319,535 B2
(45) Date of Patent: Jan. 15, 2008

(54) AUTHENTICATION SYSTEM AND METHOD FOR IMAGING SYSTEM

(75) Inventors: Darrel Cherry, Boise, ID (US); James Clough, Boise, ID (US); Steven R. Wiley, Boise, ID (US)

(73) Assignee: Hewlett-Packard Development Company,, Houston, TX (US)

(*) Notice: Subject to any disclaimer, the term of this patent is extended or adjusted under 35 U.S.C. 154(b) by 835 days.

(21) Appl. No.: 10/320,957

(22) Filed: Dec. 17, 2002

(65) Prior Publication Data

US 2004/0114175 A1    Jun. 17, 2004

(51) Int. Cl.
*G06K 15/00* (2006.01)
*G06F 3/12* (2006.01)

(52) U.S. Cl. .................................... 358/1.14; 358/1.15

(58) Field of Classification Search ............... 358/1.15, 358/1.14, 1.13, 1.1, 1.6, 1.18, 407, 468, 437; 705/410; 340/825.31, 5.1, 5.54, 5.8, 5.85, 340/5.86; 709/229; 380/201, 202, 203, 380/243
See application file for complete search history.

(56) References Cited

U.S. PATENT DOCUMENTS

| | | | | |
|---|---|---|---|---|
| 5,638,513 A | * | 6/1997 | Ananda | 726/5 |
| 5,838,458 A | * | 11/1998 | Tsai | 358/402 |
| 6,009,417 A | * | 12/1999 | Brookner et al. | 705/410 |
| 6,078,908 A | * | 6/2000 | Schmitz | 705/50 |
| 6,097,306 A | * | 8/2000 | Leon et al. | 340/5.1 |
| 6,362,893 B1 | * | 3/2002 | Francis et al. | 358/1.14 |
| 6,449,651 B1 | * | 9/2002 | Dorfman et al. | 709/229 |
| 2002/0178354 A1 | * | 11/2002 | Ogg et al. | 713/155 |

* cited by examiner

*Primary Examiner*—Dov Popovici (57) ABSTRACT

An imaging system includes an authorization logic that authenticates a imaging request. The system determines whether the imaging request includes a code that matches an access code that is displayed by an imaging device in the system. If there is a match, the imaging request is processed.

28 Claims, 5 Drawing Sheets

AUTHENTICATION SYSTEM AND METHOD FOR IMAGING SYSTEM

BACKGROUND

The invention relates to the imaging arts. It finds particular application to an imaging system having an authentication system and method.

Some imaging devices such as printers may be capable of accepting print requests from an external network such as the Internet. These print requests are typically accepted for printing which potentially allows unauthorized requests to print messages such as Spam e-mail that consumes the resources of the printer. In a system where the printer is in a public location, for example in a hotel, a user is assumed to be an authorized user when the user directly connects to the printer, such as by a cable, to print a request. However, when the user sends the print request over the Internet to the same printer, authorization is more difficult to determine.

A new and useful method and system of imaging is provided that addresses the above problems.

SUMMARY

In accordance with one embodiment, a system for processing imaging requests to one or more imaging devices is provided. The system comprises an authorization logic configured to authenticate imaging requests directed to the one or more imaging devices by determining whether the imaging request includes an access code currently assigned to one of the imaging devices. A communication logic transmits the imaging request to the one imaging device if the imaging request includes the access code currently assigned.

BRIEF DESCRIPTION OF THE DRAWINGS

In the accompanying drawings which are incorporated in and constitute a part of the specification, embodiments of a system and method are illustrated, which, together with the detailed description given below, serve to describe the example embodiments of the system and method. It will be appreciated that the illustrated boundaries of elements (e.g. boxes or groups of boxes) in the figures represent one example of the boundaries. One of ordinary skill in the art will appreciate that one element may be designed as multiple elements or that multiple elements may be designed as one element. An element shown as an internal component of another element may be implemented as an external component and vise versa.

DETAILED DESCRIPTION OF ILLUSTRATED EMBODIMENTS

The following includes definitions of selected terms used throughout the disclosure. Both singular and plural forms of all terms fall within each meaning:

"Computer-readable medium" as used herein refers to any medium that participates in directly or indirectly providing signals, instructions and/or data to one or more processors for execution. Such a medium may take many forms, including but not limited to, non-volatile media, volatile media, and transmission media. Non-volatile media may include, for example, optical or magnetic disks. Volatile media may include dynamic memory. Transmission media may include coaxial cables, copper wire, and fiber optic cables. Transmission media can also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, a FLASH-EPROM, any other memory chip or cartridge, a carrier wave/pulse, or any other medium from which a computer, processor or other electronic device can read.

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), a programmed logic device, memory device containing instructions, or the like. Logic may also be fully embodied as software.

"Signal", as used herein, includes but is not limited to one or more electrical signals, analog or digital signals, one or more computer or processor instructions, messages, a bit or bit stream, or other means that can be received, transmitted, and/or detected.

"Software", as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"User", as used herein, includes but is not limited to one or more persons, software, computers or other devices, or combinations of these.

Briefly describing one embodiment of the present system and method, it provides a mechanism to authenticate users of an imaging system in public spaces. For example, in a system where a printer receives jobs over the Internet and the printer is in a public place, the present system authenticates the received job before allowing it to be printed. In general, the system assigns an access code to each imaging device which displays the access code. A user of the system submits a print job to the system, and in the print job, the access code is inputted. This can happen in many forms. In an e-mail forwarding print mechanism, the access code can be part of the e-mail address, subject, or e-mail body. In a Personal Digital Assistant (PDA), mobile print mechanism, the access code can be entered to a custom application running on the PDA. In a laptop mobile print mechanism, it could be embedded inside the print job data, meta-data, or job ticket. Any input mechanism can include the access code in web service requests (utilizing an interface like the Print Service Interface (PSI) defined by the Printer Working Group) as a parameter to the print web service call. When the print job is received, the access code is checked. If the access code is valid, the authorization system allows the print job to enter the system.

Figure 1:
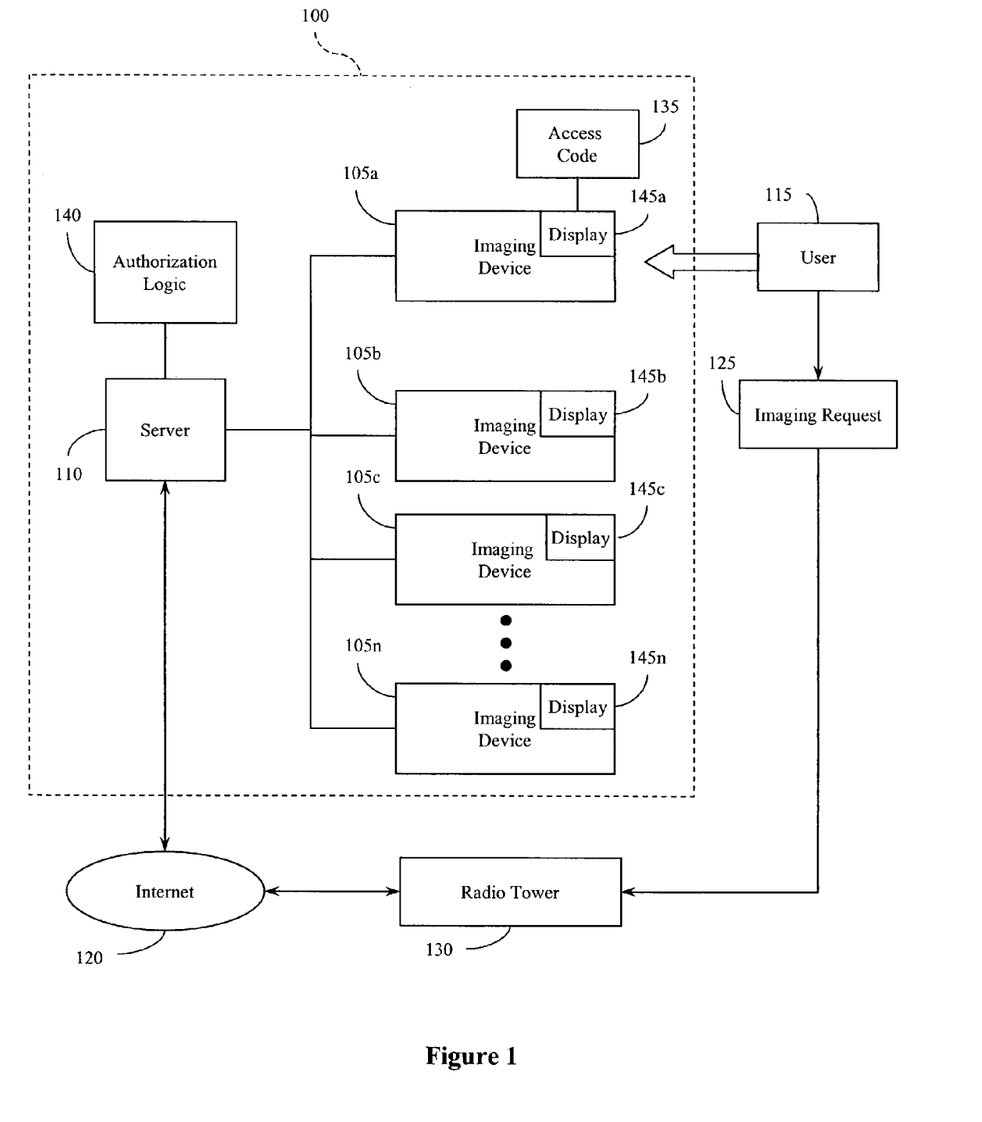
FIG. 1 is an example system diagram of one embodiment of an imaging system having an authorization system.

Illustrated in FIG. 1 is one embodiment of an imaging system 100 having an authorization system that controls imaging requests sent to the system. In this embodiment, one or more imaging devices 105a-n are networked together through one or more servers 110. An imaging device may be any type of printer, facsimile machine, copier, multifunctional device or other type of image forming device. The present example will be discussed with reference to a hotel environment where any number of hotel rooms contain a printer accessible by a hotel guest/user 115. In the following example, user 115 is in the same room as imaging device 105a.

The system 100 is configured to accept print requests from the Internet 120 which allows a guest to print without needing a direct connection to the imaging device 105a-n. Thus, by knowing the address of the hotel server 110, the user can generate an imaging request 125 (also referred to herein as a print request) which may be in the form of an e-mail message, web service, PSI request or HTTP post that is transmitted through the Internet 120 to the server 110. However, the address of the server 110 can be easily obtained by unauthorized parties making it susceptible to receiving Spam e-mail or other unauthorized print requests that the hotel wishes to prevent or at least reduce.

In this example, the user 115 desires to print a document to the imaging device 105a that is in his/her room. However, the user 115 has a device that is not connected or easily connectable to the imaging device 105a. Such a device may be a laptop computer, personal digital assistant, cell phone, wireless messaging device (eg. Blackberry), remote computing device, or any other portable processing device. In one embodiment, the user's device has cellular capability that establishes a connection to a cellular network through, for example, a radio tower 130 which then connects to the Internet 120. With this type of device, the user 115 may transmit an e-mail message to the server 110 and communicate with the imaging device 105a. Of course, it will be appreciated that communication with the server 110 may be made through other types of networks such as the user having a direct connection to the Internet, user to a local area network to the Internet, or other types of connections.

To prevent unauthorized printing of messages, documents, spam e-mail, or other files, the system 100 includes authorization logic 140 that is configured to verify the authenticity of the imaging request 125 before routing it to the appropriate imaging device. An authorized user would be one that is in the physical vicinity of the imaging device (e.g. a guest using a printer in their room). To identify that the imaging request 125 is associated with the user 115 in the hotel room rather than from an unknown source, the authorization logic 140 generates and assigns an access code 135 to each of the imaging devices 105 in the network. The authorization logic 140 then causes the imaging device to display the access code 135 on a display 145a. In this manner, the user 115 can visually see the access code 135 if the user is in the physical vicinity of the imaging device 105a allowing the user to include the proper access code 135 in the imaging request 125.

To be an authorized request to the imaging device 105a, the imaging request 125 would include the access code 135. The code may be included, for example, in the e-mail header, the subject line, body of the text, or attached/ associated with the imaging request 125 according to a predetermined protocol. This protocol may be conveyed to the user 115 by administrators of the system 100, for example, by a hotel staff member, or it may be determined by the printing client. It will be appreciated that an access code may also be inputting into an imaging request programmatically by software or other device.

When the server 110 receives an e-mail message or other type of print request, the request is analyzed by the authorization logic 140 to determine if an access code is present. If a code is present, comparison logic compares it with the set of valid access codes assigned to the imaging devices 105. If there is a match with one of the imaging devices 105a-n, the authorization logic 140 transmits the request to the associated imaging device for printing which should be the imaging device within the room of the user 115.

In another embodiment, the authorization logic 140 includes logic to dynamically change the access code 135 assigned to each imaging device. For example, new access codes may be periodically generated at predetermined time intervals so that any particular access code 135 is valid for the predetermined time. New access codes may be generated every minute, every five minutes, or any desired interval. A unique number generator may be used to generate an access code for each imaging device 105 such that the authorization logic 140 can associate an imaging request to one of the imaging devices. Various types of number generator software may be used as well as logic configured to generate various types of access codes. For example, a random number generator can generate random unique access codes, sufficiently unique access codes, and/or combinations of numbers and characters. The number generator may also be a sequential counter, an algorithm that generates known sequences or combinations of these. It will be appreciated that an access code may include any type of characters and is not limited to numbers. In this manner, the system 100 can reduce or prevent unauthorized e-mail and imaging requests received from external networks by identifying valid requests with access codes included therein.

Figure 2:
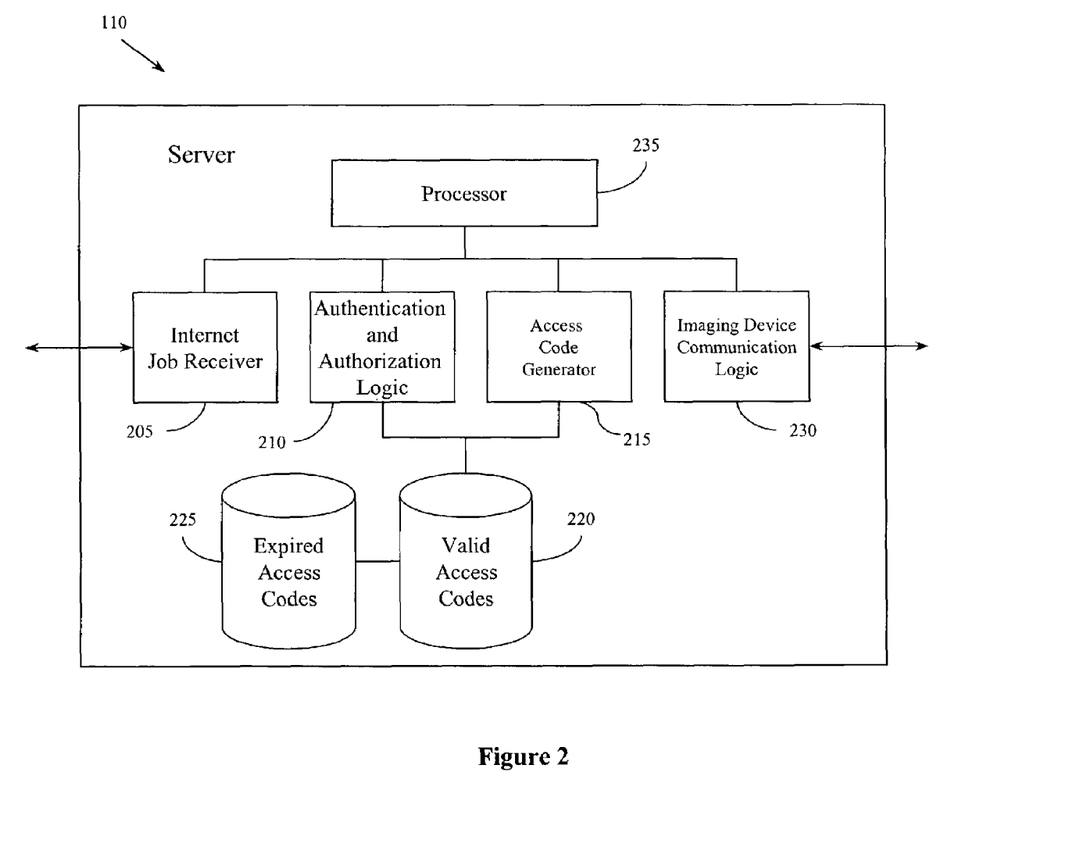
FIG. 2 is a diagram of another embodiment of server with an authorization system.

Illustrated in FIG. 2 is another embodiment of the server 110 including an authorization system. The server 110 includes an Internet job receiver 205 that is configured to communicate with the Internet and receive print requests. Print requests can arrive in the form of web service requests, HTTP POST messages, e-mail messages, etc. The receiver 205 includes communication logic based on a selected protocol such as HTTP, SMTP, ftp, or other available protocol. An authentication and authorization logic 210 analyzes a received print request to determine the presence of an access code and authenticates the access code as being valid or invalid. An access code generator 215 is configured to generate and assign access codes to each imaging device, and maintains the currently assigned codes in a set of valid access codes 220 to be used in the authorization process. The valid access codes 220 may be maintained in a database, tables, one or more text files, linked lists, or other desired data structure and stored in a computer-readable medium. A history file may also be maintained containing expired access codes 225 that have been replaced by the current valid access codes 220. The access code generator 215 may be implemented in logic.

The authorization logic 210 may include maintenance logic that handles the current set of valid access codes 220 and one or more sets of expired access codes 225. An aging algorithm may be applied to the expired access codes such that they are stored for a predetermined time period until they are removed and are no longer valid. With an aging mechanism, a user may generate an imaging request with a valid access code which may not be a current valid access code once received by the system. Rather than discarding an otherwise valid imaging request, the system would allow the processing of the imaging request as long as the access code was previously valid within a selected expiration period. The expiration period may be five minutes, ten minutes or any desired time interval. Of course, the aging mechanism is optional.

With further reference to FIG. 2, if the authorization logic 210 matches an access code from an imaging request with one of the valid access codes 220, the request is transmitted to the associated imaging device through an imaging device communication logic 230. The logic 230 includes a selected connectivity device such as a cable(s) or wireless connection(s), and a networking protocol. In general, the components of the server 110 are controlled by a processor 235 that processes computer executable instructions in accordance with an operating system.

Figure 3:
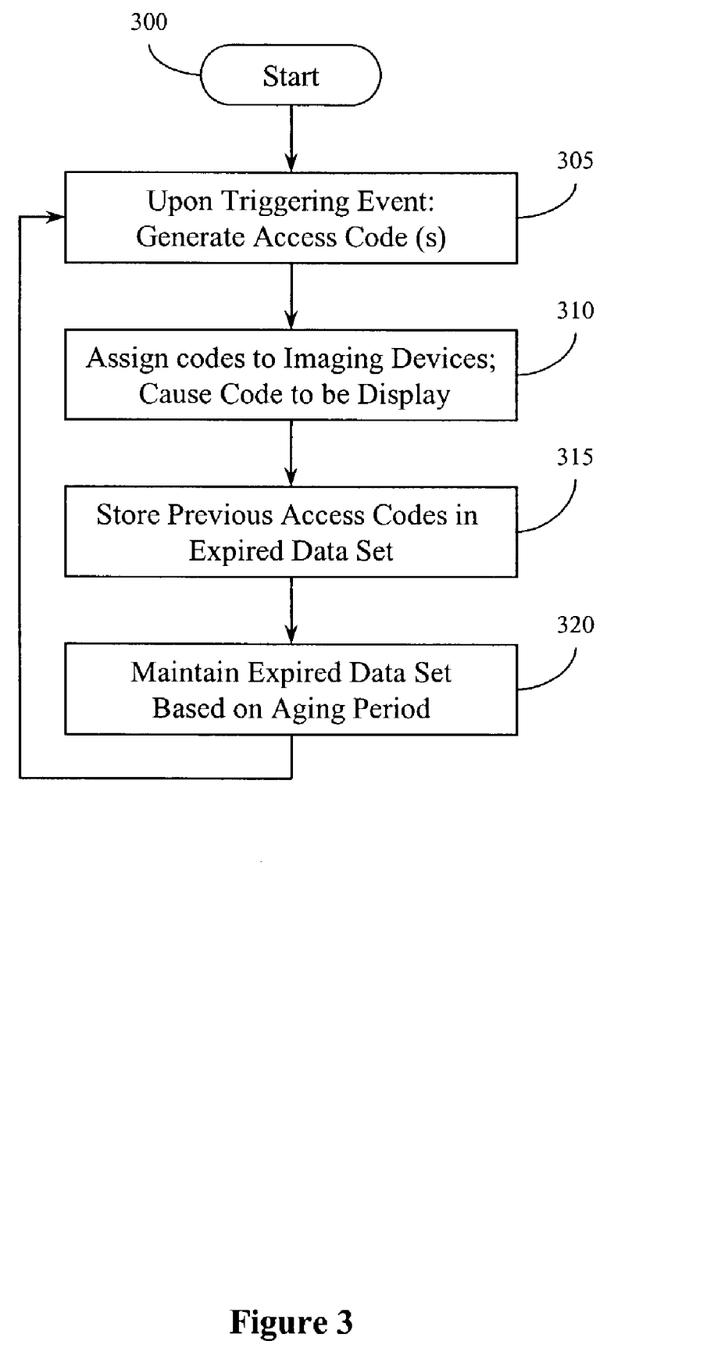
FIG. 3 is an example methodology of generating access codes.

Illustrated in FIG. 3 is one embodiment of a methodology 300 associated with administering access codes. The illustrated elements denote "processing blocks" and represent computer software instructions or groups of instructions that cause a computer to perform an action(s) and/or to make decisions. Alternatively, the processing blocks may represent functions and/or actions performed by functionally equivalent circuits such as a digital signal processor circuit, an application specific integrated circuit (ASIC), or other logic device. The diagram, as well as the other illustrated diagrams, does not depict syntax of any particular programming language. Rather, the diagram illustrates functional information one skilled in the art could use to fabricate circuits, generate computer software, or use a combination of hardware and software to perform the illustrated processing. It will be appreciated that electronic and software applications may involve dynamic and flexible processes such that the illustrated blocks can be performed in other sequences different than the one shown and/or blocks may be combined or, separated into multiple components. They may also be implemented using various programming approaches such as machine language, procedural, object oriented and/or artificial intelligence techniques. The foregoing applies to all methodologies described herein.

With reference to FIG. 3, access codes are generated based on a selected triggering event (Block 305). For example, the triggering event may be a defined time interval where new access codes are generated for each imaging device within the interval. This may be every one minute, two minutes, ten minutes, once a day, or other intervals depending on a desired level of security. Each access code may be generated, for example, using a number generator that generates a random globally unique identifier (GUID) for each imaging device. However, complete uniqueness may not be necessary and may result in a large identifier that is cumbersome for a user to input into an imaging request. In this case, a globally unique identifier may be refactored or truncated down to a smaller number of characters such as 4-8 characters or other size. Other types of number generators have been previously described which may include non-numeric characters.

In another embodiment, a common access code may be used for all imaging devices on a network. A second level of identification may then be used which is inputted by a user along with the common access code to identify an imaging request. For example, a valid access code may include both the common access code and a room number. For instance, if the common access code is "B4Z6" and the hotel room is "201", a user in this room would see the access code displayed on the imaging device and input "B4Z6201" into an imaging request. Of course, the user would have to be informed of the access code format from the hotel staff, literature, or displayed on the device in order to print to the imaging device.

With further reference to FIG. 3, once the access codes are generated, they are assigned to each imaging device and each associated imaging device is instructed to display the code on its panel display (Block 310). Alternately, the access code may be displayed by printing it on a sheet of paper so that it is visible to a hotel guest. As a new set of access codes are assigned, they replace a previous valid set of access codes. The previous access codes may be stored in an expired data set (Block 315). The expired data set may then be maintained for a selected aging period (Block 320) giving a user some flexibility when requesting an imaging request/ print job. An imaging request may be created near the end of the access code interval such that when received by the network, it now includes an expired access code. Rather than disallowing the print request, expired access codes may be accepted for a selected time period.

Figure 4:
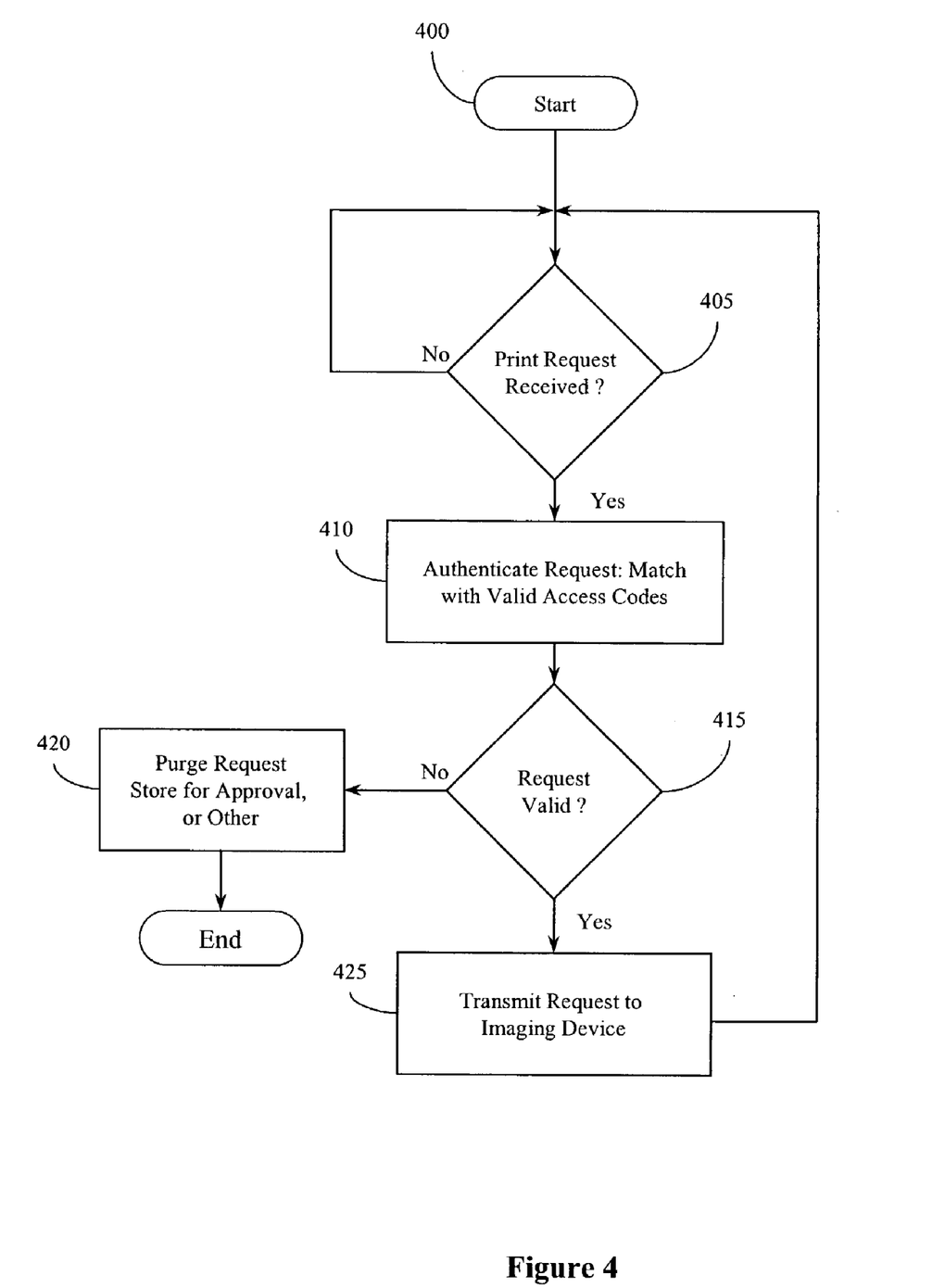
FIG. 4 is an example methodology of authenticating an imaging request.

With reference to FIG. 4, an example methodology 400 is shown for authenticating an imaging/print request. The authentication process is initiated once an imaging request is received (Block 405). As explained previously, imaging requests are received from an external network such as the Internet, and the request is directed to an imaging device within the local network. If a print request is received, the request is authenticated before it is processed (Block 410). This includes, for example, identifying the access code from the print request/e-mail message and matching the access code with the set of valid access codes stored in the system. If the system is configured to have an aging mechanism, the access code is also checked with the set of expired access codes which will still be accepted.

If the access code is not found in the set of valid codes or expired codes, or if no access code is found in the imaging request, the request is deemed invalid and may be handled in a variety of ways. For example, the request may be purged, it may be placed in a pending queue awaiting for separate approval, or other desired action (Block 420). If the request is valid at Block 415, the request is further processed if necessary and then transmitted to the imaging device associated with the access code (Block 425) and the print request can be processed.

Figure 5:
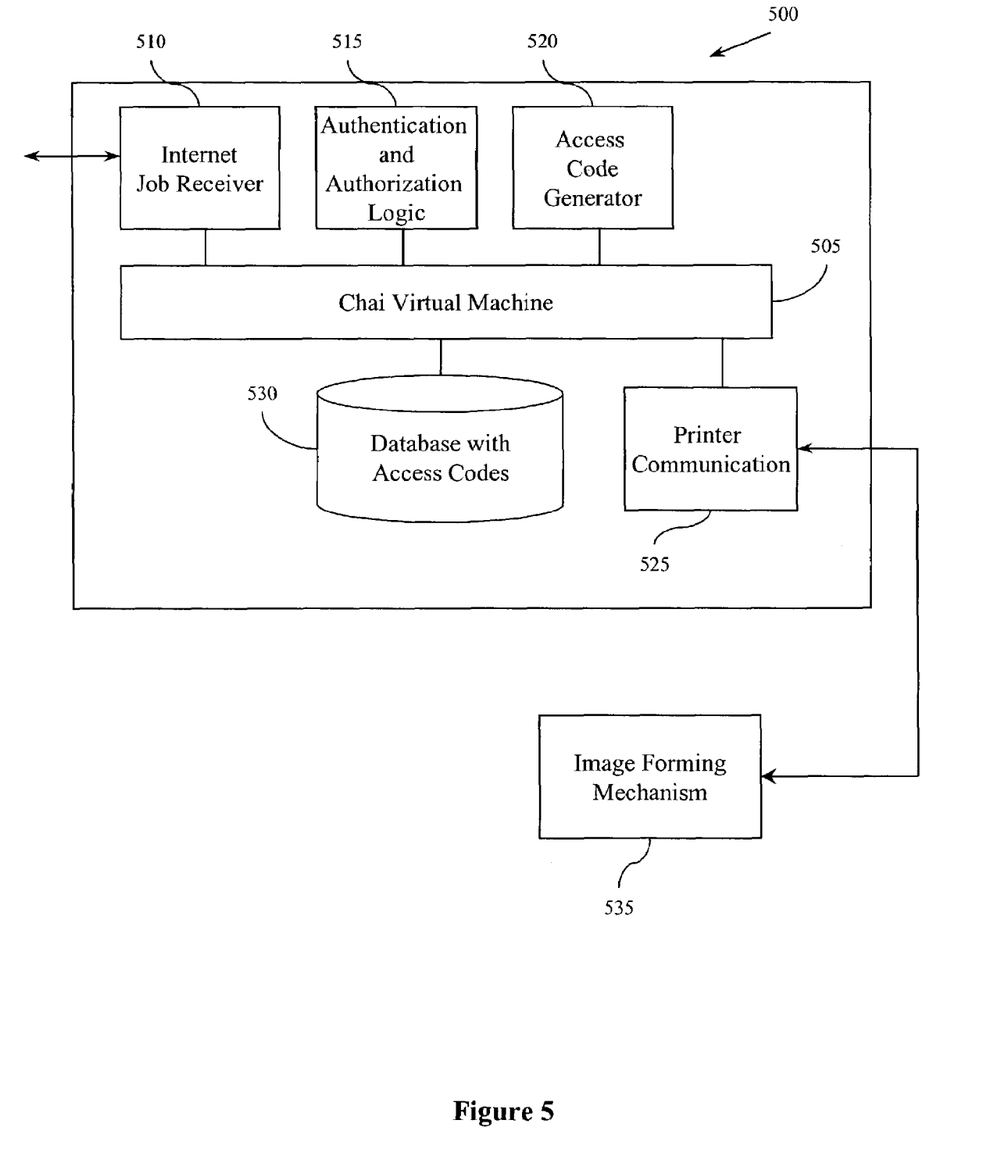
FIG. 5 is another embodiment of an authorization system within an imaging device.

Illustrated in FIG. 5 is another embodiment of an authorization system 500 that is embodied within an imaging device. In this embodiment, the imaging device includes logic capable of executing instructions in order to perform the authorization mechanism. For example, a Chai virtual machine 505 is included that runs a Java server engine. The virtual machine 505 controls other components such as an Internet job receiver 510, an authentication and authorization logic 515, an access code generator 520, and printer communication 525. These components are programmed to function similar to their corresponding components as shown in FIG. 2. The imaging device also includes memory, storage or both to maintain one or more valid access codes 530 which includes a currently displayed access code and one or more expired codes if desired.

The imaging device would have a valid network address such that it can be accessed through a remote network such as the Internet. When a print request is received from a remote network, the authorization logic 515 determines if the request includes a code that matches one of the stored access codes 530. If there is a match, the request is valid and is sent to an image forming mechanism 535 of the imaging device to process the print request. The image forming mechanism 535 will vary based on the type of imaging device which may include a laser imaging mechanism, other toner-based imaging mechanisms, ink jet mechanism, digital imaging mechanism, or other imaging reproduction engine.

With this embodiment, each imaging device may be independently controlled and maintain its own authorization system, or it may rely on a master imaging device with an authorization system. A print server may be used with this type of imaging device and it will be appreciated that variations of embodiments shown in FIGS. 2 and 5 may be implemented with different functionalities being divided between the server and the imaging device.

With the described systems and methods, a mechanism is provided for user authentication where a user who desires a print job to be printed has physical access to the imaging device. In public venues, such as hotels, this could be a guest in a hotel room who is sending a print job over the Internet from their PDA. Alternately, the guest may call an assistant from another location to transmit a print job to the hotel room by giving the assistant the current valid access code of the imaging device. In this manner, a document or e-mail message that is not in the possession of the hotel guest may be sent directly to the printer in their room. By authenticating print jobs, the operator of the imaging network (e.g. the hotel) can prevent malicious or unauthorized print jobs from being sent to room printers. Furthermore, the system may appropriately monitor and track print jobs so that they are correctly associated and billed to the appropriate guest. In that regard, billing logic may be configured to track print requests and access code usage and assign a selected fee to each room corresponding with the access code used.

Suitable software for implementing the various components of the present system and method are readily provided by those of skill in the art using the teachings presented here and programming languages and tools such as Java, Pascal, C++, C, CGI, Perl, SQL, APIs, SDKs, assembly, firmware, microcode, and/or other languages and tools. The components embodied as software include computer readable/executable instructions that cause a computer to behave in a prescribed manner. Any software, whether an entire system or a component of a system, may be embodied as an article of manufacture and/or stored in a computer readable medium as defined previously. It will be appreciated that components described herein may be implemented as separate components or may be combined together.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A system for processing imaging requests to one or more imaging devices, the system comprising:

an authorization logic configured to authenticate imaging requests directed to the one or more imaging devices by determining whether the imaging request includes an access code currently assigned to one of the imaging devices; and communication logic for transmitting the imaging request to the one imaging device if the imaging request includes the access code currently assigned.

2. The system of claim 1 further including an access code generator for generating access codes to be assigned to each of the one or more Imaging devices.

3. The system of claim 2 further including logic for causing the one or more imaging devices to display an access code.

4. The system of claim 2 wherein each access code is unique for each of the one or more imaging devices.

5. The system of claim 1 wherein the authorization logic includes logic to assign and change an access code for an imaging device based on a predetermined time period.

6. The system of claim 1 further including means for storing a set of valid access codes.

7. The system of claim 1 wherein the imaging request is received from a remote network.

8. An imaging system comprising:

one or more imaging devices;

one or more servers in communication with the one or more imaging devices forming a first network, the one or more servers are configured to control imaging requests to the one or more imaging devices;

an access code generator for generating valid access codes associated to each of the one or more imaging devices, a valid access code being displayed by the associated imaging device allowing a user to include the valid access code in an imaging request destined to the associated imaging device;

authorization logic for authenticating an imaging request received from a second network by verifying that the imaging request includes the valid access code.

9. The system of claim 8 wherein the access code is unique for each of the one or more imaging devices.

10. The system of claim 8 wherein the access code generator dynamically changes the access codes associated to each of the one or more imaging devices.

11. The system of claim 8 further including a set of valid access codes that are stored from the access code generator.

12. The system of claim 8 wherein the first network is an intranet network and the second network in the internet.

13. The system of claim 8 wherein the authentication logic and the access code generator are embodied within each of the one or more imaging devices.

14. An article of manufacture embodied in a computer-readable medium for use in a processing system for controlling imaging requests to an imaging device, the article of manufacture comprising:

first processor executable instructions for causing a processing system to assign an access code to the imaging device;

second processor executable instructions for causing a processing system to authenticate an imaging request to the imaging device by verifying that the imaging request includes the assigned access code; and third processor executable instructions for causing a processing system to transmit the imaging request to the imaging device based on whether the imaging request was authenticated.

15. The article of manufacture as set forth in claim 14 wherein the first processor executable instructions further including instructions for causing a processing system to change the access code to the imaging device at selected intervals.

16. The article of manufacture as set forth in claim 14 wherein the processing system is embodied as a server.

17. The article of manufacture as set forth in claim 14 wherein the processing system is embodied within an imaging device.

18. The article of manufacture as set forth in claim 14 further including fourth executable instructions for causing a processing system to instruct the imaging device to visibly display the access code.

19. A method of authorizing an imaging request directed to an imaging device, the method comprising the steps of:
   assigning a valid authorization code to the imaging device;
   analyzing the imaging request for an authorization code; and
   transmitting the imaging request to the imaging device if the authorization code matches the valid authorization code.

20. The method as set forth in claim 19 further including generating valid authorization codes using a random number generator.

21. The method as set forth in claim 19 further including causing the imaging device to display the valid authorization code such that it is visible.

22. The method as set forth in claim 19 further including:
   maintaining a set of valid authorization codes from a plurality of imaging devices that are networked together;
   comparing the authorization code with the set of valid authorization codes to determine a match.

23. The method as set forth in claim 19 further including receiving the imaging request from an external network.

24. The method as set forth in claim 19 further including periodically modifying the valid authorization code for the imaging device.

25. An image forming device comprising:
   logic configured to display an access code;
   authorization logic configured to authenticate a imaging request when received from a remote network including logic configured to determine whether the imaging request includes a code that matches the access code displayed; and
   an image forming mechanism for forming an image in accordance with the imaging request if the code matches the access code.

26. The image forming device of claim 25 further including an access code generator for generating one or more access codes to be displayed by the imaging device.

27. The image forming device of claim 26 wherein the access code generator is configured to generate a unique access code.

28. The image forming device of claim 26 wherein the access code generator generates a different access code for the imaging device based on a selected time period.

* * * * *

UNITED STATES PATENT AND TRADEMARK OFFICE
CERTIFICATE OF CORRECTION

PATENT NO. : 7,319,535 B2  
APPLICATION NO. : 10/320957  
DATED : January 15, 2008  
INVENTOR(S) : Darrel Cherry et al.

Page 1 of 1

It is certified that error appears in the above-identified patent and that said Letters Patent is hereby corrected as shown below:

Title page, Item (73), under "Assignee" after "Company," insert -- L.P. --.

In column 8, line 11, in Claim 2, delete "Imaging" and insert -- imaging --, therefor.

In column 8, line 47, in Claim 12, delete "internet." and insert -- Internet. --, therefor.

Signed and Sealed this

Twenty-seventh Day of May, 2008

JON W. DUDAS  
*Director of the United States Patent and Trademark Office*